United States Patent [19]

Jonas et al.

[11] Patent Number: 4,902,573
[45] Date of Patent: Feb. 20, 1990

[54] METHOD FOR ANTISTATIC FINISHING OF ADHESIVE THERMOPLASTIC COATINGS

[75] Inventors: Friedrich Jonas, Aachen; Werner Waldenrath, Cologne, both of Fed. Rep. of Germany

[73] Assignee: Bayer Aktiengesellschaft, Leverkusen, Fed. Rep. of Germany

[21] Appl. No.: 235,065

[22] Filed: Aug. 22, 1988

[30] Foreign Application Priority Data

Sep. 5, 1987 [DE] Fed. Rep. of Germany ....... 3729875

[51] Int. Cl.$^4$ .............................................. B05D 5/10
[52] U.S. Cl. .............................. 428/411.1; 427/208.2; 427/261; 427/333; 427/340; 427/407.1; 428/349

[58] Field of Search ................... 427/208.2, 208.8, 333, 427/340, 341; 428/411.1, 349

Primary Examiner—Bernard Pianalto
Attorney, Agent, or Firm—Sprung Horn Kramer & Woods

[57] ABSTRACT

The invention relates to a method for the production of shaped plastic parts which are provided with an antistatic adhesive thermoplastic coating; according to the method, the adhesive thermoplastic coating is coated with a solution which contains a binder and a suitable oxidant for the oxidative polymerization of 5- or 6-membered heterocyclic compounds which have nitrogen or sulphur as heteroatoms, and the coating thus obtained is treated with a solution of the 5- or 6-membered heterocyclic compound.

12 Claims, 1 Drawing Sheet

METHOD FOR ANTISTATIC FINISHING OF ADHESIVE THERMOPLASTIC COATINGS

The invention relates to a method for antistatic finishing of adhesive thermoplastic coatings present on shaped plastic parts.

Packing materials which have an antistatic finish are increasingly employed for the packing of electronic components, in order to prevent damage to the components by static charge. The surface resistance of these packing materials should lie between $R_s=10^1 \Omega$ and $10^9 \Omega$. Today, continuous bands (see FIG. 1) are specifically employed for small electronic modules. These continuous bands consist of plastic bands (1) which have an antistatic finish in which small hollows (2) are pressed by cold-forming or deep-drawing, which receive the electronic components. In order to secure the components against falling out, the hollows are closed by sealing on a heat-sealable plastic film (3). The plastic bands (1) which have an antistatic finish used as continuous bands can consist, for example, of carbon-filled plastics. Plastic films (4) provided with an adhesive thermoplastic coating (5) are used as covering film (3) (see FIG. 2).

Hitherto, these plastic films which are provided with an adhesive thermoplastic coating have not had an antistatic finish, since it was feared that the adhesive thermoplastic coatings would lose their adhesiveness owing to antistatic finishing or that the adhesiveness would be at least too severely impaired. In addition, experience with the moderate thermal stability of the antistatics hitherto used for the antistatic finishing of plastics allows us to expect that the antistatic finishing, if it does not become lost owing to the temperatures customarily used in heat-sealing (fusion), then is surely at least strongly reduced. Since an effective protection of the packed parts from electrostatic charge is only guaranteed when not only the continuous bands (1) but also the sealing films (3) have an antistatic finish, the aim existed to find a method with the aid of which it was possible to produce plastic films provided with an antistatic adhesive thermoplastic coating which fulfil requirements placed on such a sealing film, namely to still exhibit a surface resistance of $10^1$ to $10^9 \Omega$ and in addition adhesiveness distributed uniformly over the entire surface of the adhesive thermoplastic coating even after heat-sealing. The latter requirement, the uniformly distributed adhesiveness, is also an important characteristic, since the sealing films must be able to be removed again automatically i.e. using a tractive force set to a certain value.

Surprisingly, it has been found that those shaped plastic parts provided with an antistatic adhesive thermoplastic coating of uniform adhesiveness, such as plastic films, are obtained in a simple manner which can also be carried out on the commercial scale when the shaped plastic parts provided with the adhesive thermoplastic coating are coated with a solution, containing a binder, of an oxidant suitable for the oxidative polymerization of 5- or 6-membered heterocyclic compounds which contain N or S as a heteroatom and the coating thus obtained is subsequently treated with a solution of the 5- or 6-membered heterocyclic compound.

In this manner, plastic films provided with an antistatic adhesive thermoplastic coating and, if appropriate, antistatistically finished are obtained which fulfil the requirements for heat-sealing placed on sealing films, namely to have high adhesiveness distributed uniformly over the entire adhesive thermoplastic coating and at the same time surface resistance values in the range from $10^2$ to $10^8 \Omega$.

The antistatic coatings of the adhesive thermoplastic coatings obtainable by the process according to the invention furthermore exhibit the advantage that they are transparent and therefore, when transparent adhesive thermoplastic coatings and supporting films are used, give transparent sealing films provided with an antistatic adhesive thermoplastic coating, which films permit visual control of the sealed plastic packings.

The invention therefore relates to a method for the production of shaped plastic parts provided with an antistatic adhesive thermoplastic coating, which is characterized in that the adhesive thermoplastic coating is coated with a solution which contains a binder and a suitable oxidant for the oxidative polymerization of the 5- or 6-membered heterocyclic compounds which contain nitrogen or sulphur as a heteroatom and the coating thus obtained is treated with a solution of the 5-or 6-membered heterocyclic compound.

The use of polymers of 5- or 6-membered heterocycles which have nitrogen or sulphur as a heteroatom, in particular polypyrrole, is known for the antistatic finishing of plastics; see, for example, EP-A-No. 0,206,133, EP-A-No. 0,206,414, DE-OS (German Published Specification) No. 3,321,281, DE-OS (German Published Specification) No. 3,544,957 and U.S. Pat. No. 4,604,427.

According to the process described in EP-A-No. 0,206,414, porous shaped plastic parts, and according to the process described in U.S. Pat. No. 4,604,427 nonporous plastic parts, are first steeped in a pyrrole solution; subsequently the pyrrole applied to the surface is polymerized by treating the shaped plastic parts with the solution of an oxidant, for example an aqueous $FeCl_3$ solution to give polypyrrole. This method is not utilizable for antistatic finishing of adhesive thermoplastic coatings, since the oxidation bath is rendered unusable, already after short usage, by black deposits of polypyrrole resulting from pyrrole which is washed out. The deposits settle on the surface of the adhesive thermoplastic on further use of the bath and impair its adhesiveness. In order to achieve an antistatic adhesive thermoplastic coating of uniform adhesiveness it is therefore necessary to exchange the oxidation bath even after short usage; however, this frequent bath exchange makes the method uneconomical.

In EP-A-No. 0,206,133 and DE-OS (German Published Specifications) Nos. 3,321,281 and 3,544,957, a method for the production of conductive polypyrrole layers on shaped plastic parts is described, according to which the shaped parts are first treated with the solution of the oxidant and subsequently with pyrrole present in the vapour form or dissolved form. This method is unsuitable for antistatic finishing of adhesive thermoplastic coatings, since with it either adhesive thermoplastic coatings are obtained which have insufficient adhesiveness combined with sufficient electrical conductivity or which have insufficient electrical conductivity combined with sufficient adhesiveness.

According to the method described in DE-OS (German Published Specification) No. 3,634,226, oxidants, pyrrole and water-soluble binder are jointly applied to the plastic surface. The antistatic adhesive thermoplastic coatings obtained using this procedure have insufficient adhesiveness, in particular insufficient uniformity of adhesiveness. In addition, the antistatic finishing of the adhesive thermoplastic coatings thus obtained has the disadvantage that it is not transparent.

The charge-transfer (CT) complexes described in DE-OS (German Published Specification) No. 3,440,914 for the antistatic finishing of plastic films, which are derived, for example, from tetrathiofulvalene and/or tetracyanoquinodimethane, are not suitable for antistatic finishing of adhesive thermoplastic coatings on account of their thermal instability.

Thiophenes, furans and substituted pyrroles can be employed in the method according to the invention as 5- or 6-membered heterocyclic compounds which may contain nitrogen or sulphur; pyrrole is preferably used.

The dry film thickness, i.e. the thickness of the antistatic coating to be applied after drying, is advantageously 0.1 to 3.0 μm, corresponding to a wet film thickness of 0.2 μm to 60 μm. Within this range, the dry film thickness is to be coordinated with the thickness of the adhesive thermoplastic coating such that the dry film thickness of the antistatic coating should be at most 50%, preferably 2 to 50% of the thickness of the adhesive thermoplastic coating. Greater layer thicknesses can have a disadvantageous effect on the adhesiveness of the adhesive thermoplastic coatings and on the transparency, and in some cases can have a disadvantageous effect on the electrical conductivity of the antistatic coatings.

According to a preferred embodiment of the method according to the invention, the adhesive thermoplastic coating is coated with a solution which contains a suitable oxidant for the oxidative polymerization of the heterocyclic compounds and an organic polymeric binder which is not soluble in water in an organic solvent; furthermore the coated adhesive thermoplastic coating is treated with a solution of the heterocyclic compound in such an organic solvent in which the adhesive thermoplastic and the substances, oxidants and organic polymeric binders applied to this are not soluble.

In addition, it has proved advantageous to remove the organic solvent from the coating after the coating of the adhesive thermoplastic coating with the oxidant solution and before the treatment with the solution of the heterocyclic compound and to wash the coated adhesive thermoplastic coating to remove the non-polymerically bound inorganic compounds with water after the treatment with the solution of the heterocyclic compound.

It has in fact been found that these non-polymerically bound inorganic compounds can lead to degradation of the binder polymer, in particular at higher temperatures. By this washing out, is achieved that no discoloration of the transparent antistatic coating on the adhesive thermoplastic coatings occurs, even with thermal loading.

The solvent is removed from the antistatic coatings by evaporation, if appropriate at elevated temperature and/or under reduced pressure.

For the oxidative polymerization of the 5- or 6-membered heterocyclic compounds such as pyrrole, suitable oxidants are known and are described, for example, in the publication J. Am. Chem. Soc. 85, 454 (1963). For carrying out the method according to the invention, $AlCl_3$, $AlCl_3$-$CuCl_2$, iron-III salts such as $FeCl_3$ and $Fe(ClO_4)_3$, $SbCl_5$, $MoCl_5$, $H_2SO_5$ and $K_2S_2O_8$; and copper salts such as $Cu(BF_4)_2$ are particularly suitable; mixtures of the compounds mentioned may also be used. $FeCl_3$ is preferably employed.

For carrying out the method on the commercial scale, salts of trivalent iron which are derived from organic acids or inorganic acids having organic radicals are preferably used for the oxidative polymerization of the pyrrole.

By using these iron salts, corrosion of the vessels and apparatus parts, in which or with which the coating of the shaped plastic parts according to the invention is performed, is avoided. The corrosion leads to considerable difficulties and, not only to damage to the vessels and apparatus parts, but also to an impairment of the quality of the polypyrrole coating by the corrosion products arriving in the coating solution.

The iron-III salts of the sulphuric acid hemiesters of $C_1$-$C_{20}$-alkanols, for example the Fe-III salt of lauryl sulphate may be mentioned, for example, as preferably employed iron-III salts of inorganic acids having organic radicals.

Iron-III salts of organic acids which may be mentioned, for example, are: the Fe-III salts of $C_1$-$C_{20}$-alkylsulphonic acids, such as methanesulphonic acid and dodecanesulphonic acid; aliphatic $C_1$-$C_{20}$-carboxylic acids such as 2-ethylhexylcarboxylic acid; aliphatic perfluorocarboxylic acids, such as trifluoroacetic acid and perfluorooctanoic acid; aliphatic dicarboxylic acids, such as oxalic acid and primarily aromatic sulphonic acids optionally substituted by $C_1$-$C_{20}$-alkyl groups such as benzenesulphonic acid, p-toluenesulphonic acid and dodecylbenzenesulphonic acid.

Mixtures of these abovementioned Fe-III salts of organic acids may also be employed.

Suitable organic polymeric binders which are not soluble in water or at least only poorly soluble are, for example, synthetic organic polymers which are soluble in organic solvents, such as polyvinyl acetate, polycarbonate, polyvinyl butyral, polyacrylates, polymethacrylates, polystyrene, polyacrylonitrile, polyvinyl chloride, polybutadiene, polyisoprene, polyethers, polyesters and silicones; copolymers which are soluble in organic solvents, such as styrene/acrylates, vinyl acetate/acrylates and ethylene/vinyl acetate copolymers can also be used. Preferred binders are polyvinyl acetate, polycarbonates, poly(meth)acrylates and copolymers of the monomers being the basis of these polymers.

The selection of the organic solvent for the production of the oxidant solution depends on the proposed binder, the adhesive thermoplastic to be coated and, if the adhesive thermoplastic and the surface of the shaped plastic part not covered by the adhesive thermoplastic are to be coated simultaneously, also on the plastic from which the shaped part is manufactured. Suitable solvents must dissolve the binder and oxidant well, but are not permitted to lead to any damage to the adhesive thermoplastic to be coated and, if appropriate, the plastic material. Examples of solvents having the required properties which may be mentioned are: aliphatic alcohols such as methanol, ethanol, isopropanol; aliphatic ketones such as acetone, methyl ethyl ketone and cyclohexanone; aliphatic carboxylic acid esters such as methyl acetate and butyl acetate; aromatic hydrocarbons such as toluene and xylene; halogenated hydrocarbons such as dichloromethane and dichloroethane, and aliphatic nitriles such as acetonitrile.

The individual solvents may be used as such or mixed with one another. In practice, mixtures of acetone and isopropanol (weight ratio 1:2) have been successfully used, for example, for the coating of adhesive thermoplastic coatings consisting of polymethacrylates and ethylene/vinyl acetate copolymers.

The content of oxidants in the coating solutions is in general 10 to 200% by weight, relative to the binder used. The total concentration of solids (oxidant and binder) is in general between 5 and 50% by weight, relative to the total weight of the solution. The total concentration of the solutions depends upon the coating method used.

Suitable methods for coating the adhesive thermoplastic coating to have an antistatic finish and, if appropriate, the surface of the shaped plastic part not covered by the adhesive thermoplastic are spraying, knife-coating, brushing and printing (for example in gravure printing).

The treatment of the adhesive thermoplastic coatings coated with oxidant and binder and dried with the solutions of the heterocyclic compounds in general takes place at room temperature, but can also be performed at lower or higher temperatures. The selection of the solvent for the heterocyclic compound depends on the binder used, the oxidant used, the adhesive thermoplastic, and, with simultaneous antistatic finishing of the plastic carrier, also on the plastic. The solvent must dissolve neither the adhesive thermoplastic to be coated nor the plastic nor the applied binder nor the oxidant. Solvents which correspond to these requirements are, for example, aliphatic hydrocarbons such as n-hexane; aromatic hydrocarbons such as benzene or toluene; or fluorinated hydrocarbons carbons such as 1,1,2-trichlorotrifluoroethane. Mixtures of these solvents may also be employed. The treatment of the coated materials with the solution of the heterocyclic compounds can take place by dipping into or spraying on of the solution. The treatment period is in general less than 1 minute. In most cases, a time of action of a few seconds is sufficient.

The concentration of the heterocyclic compound, for example the pyrrole, in the solutions is preferably 1 to 50% by weight, preferably 2 to 10% by weight, relative to the weight of the solvent.

With the aid of the method according to the invention, the shaped plastic part on which the adhesive thermoplastic coating is situated can also be antistatically finished simultaneously with the adhesive thermoplastic coating. In this case, not only the adhesive thermoplastic coating is treated as described previously, but the entire shaped part provided with an adhesive thermoplastic coating. If the shaped part is a film, then the film, provided with an antistatic adhesive thermoplastic coating and having an antistatic (6), described in FIG. 3 is obtained.

Possible support materials for the adhesive thermoplastic coatings to be finished according to the invention are primarily the following plastics: polycarbonates, polyamides, polyurethanes, polyureas, polyesters, polyethers, polypropylene, polyoxyethylene, polyvinyl chloride, polymethacrylates, polystyrene or cellulose esters and ethers.

In the context of the invention, adhesive thermoplastics are taken to mean adhesives which set without chemical reaction; these adhesives which set without chemical reaction include the actual adhesive thermoplastic substances on the one hand and heat-sealable adhesives and high-frequency (HF) welding auxiliaries on the other hand. The actual adhesive thermoplastic substances are solvent-free adhesives which can wet working material surfaces well in the warm and liquid state and which can adhere to them after cooling and solidifying. They undergo no chemical alternation during the fusion process. Examples of actual adhesive thermoplastic substances which may be mentioned are: fusible, high molecular weight ethylene/vinyl acetate copolymers and mixtures of about equal parts of ethylene/vinyl acetate copolymers with resins (balsam resins, colophony derivatives, hydrocarbon resins) and waxes or paraffins. The adhesive thermoplastic substances are processed at temperatures between 100° and 190° C.

The heat-sealable adhesives and high frequency welding auxiliaries are coating adhesives which are mostly applied to the plastics in the form of adhesive solutions. The solvent is removed before the adhesion process. The set solvent-free layer is melted by supplying heat during the sealing or with high frequency welding agents by self-warming of the adhesive substance layer in an electric field. Heat-sealable adhesives which may be mentioned, for example, are: copolymers of vinyl chloride or vinylidene chloride, furthermore copolymers of vinyl acetate and also polymethacrylates, polyurethanes and polyesters (see Ullmanns Enzyklopädie per technischen Chemie (Ullmann's Encyclopaedia of Technical Chemistry)), 4th edition, volume 14, pages 236 to 238).

DETAILED DESCRIPTION OF THE FIGURES

Figure 1:
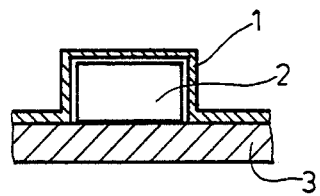
FIG. 1 shows a packing for electronic components
Figure 2:
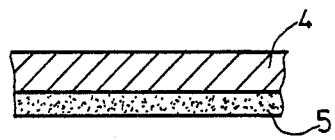
FIG. 2 shows a plastic film with an adhesive coating
Figure 3:
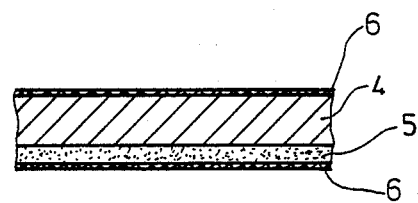
FIG. 3 shows a plastic film with an adhesive coating and an antistatic finish

FIG. 1 shows a packing material for electronic components consisting of a plastic band (1) having an antistatic finish in which small hollows (2) are pressed by cold-forming or deep-drawing. The hollows (2) are closed by sealing with a heat-sealable plastic film (3). FIG. 2 shows a plastic film (4) which is provided with an adhesive thermoplastic coating (5) which can be used as the covering film (3) of FIG. 1. FIG. 3 shows a plastic film (4) which carries an adhesive thermoplastic coating (5) and an antistatic finish (6).

EXAMPLE 1

A commercial polyester film "heat-sealing tape 318H5", a commercial product of Nitto, coated on one side with an adhesive thermoplastic; (total thickness: ~45 μm; thickness of the adhesive thermoplastic coating: ~25 μm) was coated on both sides by knife-coating using a solution of 0.6 g of $FeCl_3$, 19 g of acetone and 1 g of polyvinyl acetate (wet film thickness: about 25 μm corresponding to a dry film thickness of 1 to 2 μm). After the evaporation of the solvent, the coated film was dipped for 2 minutes into a 5% strength solution of pyrrole in a 1:1 mixture of n-hexane/toluene. After drying, the film was washed with water.

A transparent film was obtained; surface resistance of the film on both sides ~$10^5$ Ω.

The film can be adhesively sealed onto another plastic film, for example a polyester film, by heat-sealing at 120° C.

EXAMPLE 2

A procedure is used as described in Example 1, with the only difference that instead of 0.6 of $FeCl_3$, 1.0 g of $FeCl_3 \times 6H_2O$ was used.

The film obtained has a surface resistance of ~$10^4$ Ω on both sides and can be stuck together with other plastic films by heat-sealing.

EXAMPLE 3

A procedure is used as described in Example 1, only instead of 1 g of polyvinyl acetate, 1.5 g of polymethyl methacrylate is employed as the binder.

A transparent film is obtained which has a surface resistance of ~$10^6$ Ω on both sides.

The film can be bonded with other plastic films, for example polyester and polycarbonate films, by heat-sealing.

What is claimed is:

1. A method for the production of a shaped plastic part provided with an antistatic adhesive thermoplastic coating, which comprises the steps: (a) coating an adhesive thermoplastic coating with a solution which contains a binder and a suitable oxidant for the oxidative polymerization of a 5- or 6-membered heterocyclic compound which contains nitrogen or sulphur as the heteroatom, and (b) treating the coating thus obtained with a solution of the 5- or 6-membered heterocyclic compound.

2. The method of claim 1, wherein the 5- or 6-membered heterocyclic compound is pyrrole.

3. The method of claim 1, wherein the solution which is used in step (a) for the coating of the adhesive thermoplastic coating comprises ($\alpha$) the oxidant for the oxidative polymerization of the heterocyclic compound ($\beta$) an organic polymeric binder which is not soluble in water and ($\gamma$) an organic solvent, and wherein in step (b) the coated adhesive thermoplastic coating is treated with a solution of the heterocyclic compound in such an organic solvent in which the coated adhesive thermoplastic and the substances, oxidant and organic polymeric binder applied to this in step (a) are not soluble.

4. The method according to claim 3, wherein in step (a) the organic solvent is removed from the coating obtained and wherein the coating obtained after step (b) is washed with water after its treatment with the solution of the heterocyclic compound and after removal of the organic solvent in step (b).

5. The method of claim 1, wherein the thickness of the antistatic coating applied to the adhesive thermoplastic coating is 0.1 to 3.0 μm after drying.

6. The method of claim 5, wherein the thickness of the antistatic coating applied to the adhesive thermoplastic coating is at most 50% of the thickness of the adhesive thermoplastic coating.

7. The method of claim 5, wherein the thickness of the layer applied to the adhesive thermoplastic coating is 2 to 50% of the thickness of the adhesive thermoplastic coating.

8. The method of claim 1, wherein the shaped plastic part provided with an antistatic adhesive thermoplastic coating is a plastic film.

9. The method of claim 1, wherein in steps (a) and (b) also the surface of the shaped plastic part not covered with adhesive thermoplastic is coated and treated and antistatically finished in this manner.

10. The method of claim 1, wherein a salt of trivalent iron which is derived from an organic or an inorganic acid having an organic radical is used as the oxidant in step (a).

11. The method of claim 1, wherein a salt of trivalent iron which is derived from an aromatic sulphonic acid or an aromatic sulphonic acid which is substituted by a $C_1$–$C_{20}$-alkyl group is used as the oxidant.

12. A shaped plastic part prepared by the method of claim 1.

* * * * *